United States Patent [19]
Hendi et al.

[11] Patent Number: 5,424,429
[45] Date of Patent: Jun. 13, 1995

[54] PREPARATION OF PIGMENTARY 2,9-DICHLOROQUINACRIDONE

[75] Inventors: Shivakumar B. Hendi, Newark; Donald L. Bauman; Edward E. Jaffe, both of Wilmington, all of Del.

[73] Assignee: Ciba-Geigy Corporation, Ardsley, N.Y.

[21] Appl. No.: 122,024

[22] Filed: Sep. 15, 1993

[51] Int. Cl.⁶ ............................................. C09B 48/00
[52] U.S. Cl. ..................................... 546/49; 546/56
[58] Field of Search ................................. 546/49, 56

[56] References Cited

U.S. PATENT DOCUMENTS

| | | | |
|---|---|---|---|
| 2,816,114 | 12/1957 | Ehrich . | |
| 2,821,529 | 1/1958 | Struve | 546/49 |
| 3,157,659 | 11/1964 | Deuschel | 546/56 |
| 3,275,637 | 9/1966 | West | 546/56 |
| 3,342,823 | 9/1967 | Dien | 546/49 |
| 4,015,998 | 4/1977 | Jaffe | 546/56 |
| 4,197,404 | 4/1980 | Johnson | 546/49 |
| 4,455,173 | 6/1984 | Jaffe | 546/56 |
| 4,541,872 | 9/1985 | Jaffe | 546/56 |
| 5,093,497 | 3/1992 | Schutze et al. | 546/49 |
| 5,095,056 | 3/1992 | Bäbler et al. | 546/56 |
| 5,286,863 | 2/1994 | Bäbler | 546/49 |

*Primary Examiner*—Donald G. Daus
*Attorney, Agent, or Firm*—George R. Dohmann

[57] ABSTRACT

A process for the direct preparation of pigmentary 2,9-dichloroquinacridone, which comprises oxidizing 2,9-dichloro-6,13-dihydroquinacridone directly to pigmentary 2,9-dichloroquinacridone by heating a reaction mixture comprising 2,9-dichloro-6,13-dihydroquinacridone, an alkali metal hydroxide, a water-soluble organic solvent, water and effective amounts of an oxidizing agent and a phthalimidomethylquinacridone particle growth inhibitor. The process yields pigmentary 2,9-dichloroquinacridone directly; without the need for additional particle-size reducing aftertreatments.

20 Claims, No Drawings

PREPARATION OF PIGMENTARY 2,9-DICHLOROQUINACRIDONE

BACKGROUND

The quinacridone family of compounds and their pigmentary properties are well known. The pigmentary quinacridones include the parent compound, quinacridone, and various disubstituted quinacridones, including 2,9-dichloroquinacridone.

It is well known in the pigments art that substituted quinacridone pigments can be prepared by the oxidation of the corresponding dihydroquinacridones. The product of such an oxidation, known as a crude quinacridone, is generally unsuitable for use as a pigment and must be further processed to develop the requisite pigmentary properties, such as particle size, particle shape, polymorphic phase and tinctorial strength.

The crude quinacridone is commonly convened to a pigmentary form by milling the crude quinacridone with large quantities of inorganic salt followed by extraction of the resulting mill powder, or by dissolving the pigment in large quantities of concentrated sulfuric acid and drowning the solution into water (acid pasting). Since these multistep procedures generally require a diversity of operations conducted at elevated temperatures in acidic environments, simpler, more economical procedures for preparing pigmentary quinacridones are highly desirable.

It is known from U.S. Pat. No. 4,197,404 that o-carboxybenzamidomethylquinacridone, which is a hydrolysis product of 2-phthalimidomethylquinacridone, can be utilized as a particle growth inhibitor to prepare higher strength γ-quinacridone directly from the oxidation of β-dihydroquinacridone. However, the reference discloses that when more than 1.0% of o-carboxybenzamidomethylquinacridone was used, the oxidation of the β-dihydroquinacridone was inhibited. This results in incomplete conversion of D-dihydroquinacridone to γ-quinacridone.

The primary object of this invention is to prepare pigmentary 2,9-dichloroquinacridone directly during synthesis, without the need for aftertreatments. This objective is achieved by the discovery that the inhibition of the oxidation of dihydroquinacridone, which results from adding more than 1 percent of the particle growth inhibitor, does not occur during the oxidation of 2,9-dichloro-6,13-dihydroquinacridone. Therefore, additional amounts of particle growth inhibitor can be added to the reaction mixture in order to obtain pigmentary 2,9-dichloroquinacridone directly from the synthesis.

SUMMARY

It has been discovered that 2,9-dichloroquinacridone of pigmentary quality and desirable crystallinity and crystal phase can be prepared directly, without the need for further particle size reducing aftertreatments, by oxidizing 2,9-dichloro-6,13-dihydroquinacridone in the presence of a particle growth inhibitor, like a phthalimidomethylquinacridone derivative. A wide variety of 2,9-dichloroquinacridone pigments with different particle sizes and specific surface areas, and thus, varying transparency/opacity, can be prepared by using appropriate amounts of a substituted or unsubstituted particle growth inhibiting phthalimidomethylquinacridone derivative.

The oxidation of 2,9-dichloro-6,13-dihydroquinacridone is not inhibited by large amounts of a phthalimidomethylquinacridone particle growth inhibitor. Thus, the oxidation proceeds to completion in the presence of more than 1.0%, preferably more than 2%, by weight of a phthalimidomethylquinacridone and remains uninhibited with the addition of up to 10% of phthalimidomethylquinacridone. The percentage by weight of the phthalimidomethylquinacridone being based on the weight of 2,9-dichloro-6,13-dihydroquinacridone throughout this application.

Thus, the present invention relates to a process for the direct preparation of pigmentary 2,9-dichloroquinacridone, which comprises oxidizing 2,9-dichloro-6, 13-dihydroquinacridone directly to pigmentary 2,9-dichloroquinacridone in the presence of a phthalimidomethylquinacridone particle growth inhibitor or a o-carboxybenzamidomethylquinacridone hydrolysis product thereof; wherein the particle growth inhibitor is present in a quantity sufficient to yield pigmentary 2,9-dichloroquinacridone directly; without an additional particle-size reducing step. The compound 2-phthalimidomethylquinacridone is especially useful as the particle growth inhibitor.

It is of great advantage to be able to incorporate up to 10% of phthalimidomethylquinacridone because the addition of 1.0% of phthalimidomethylquinacridone does not always provide sufficient growth inhibition of 2,9-dichloroquinacridone particle size to provide a pigmentary product directly. Samples derived from the oxidation of 2,9-dichloro-6,13-dihydroquinacridone with 2% and 3% by weight of phthalimidomethylquinacridone present in the oxidation mixture are completely convened to 2,9-dichloroquinacridone and are comparable to commercial, small particle size 2,9-dichloroquinacridone pigments. Oxidation of 2,9-dichloro-6,13-dihydroquinacridone also proceeds to completion with the inclusion of 4, 5 and 6 percent by weight of phthalimidomethylquinacridone and provides very attractive transparent pigmentary 2,9-dichloroquinacridone with the transparency increasing in direct proportion to the mount of particle growth inhibitor present.

The particle size of the 2,9-dichloroquinacridone derived from the oxidation of the 2,9-dichloro-6,13-dihydroquinacridone is inversely proportional to the mount of the growth inhibiting agent present during the oxidation reaction. Thus, a smaller particle size 2,9-dichloroquinacridone is obtained when more particle growth inhibitor is added to the reaction mixture.

The present process provides an improvement in simplicity and economy for the preparation of a variety of small particle size 2,9-dichloroquinacridone pigments. According to this invention, the direct preparation of pigmentary 2,9-dichloroquinacridones is accomplished simply by oxidizing 2,9-dichloro-6,13-dihydroquinacridone by known methods in the presence of the appropriate amount of a phthalimidomethylquinacridone particle growth inhibitor. This approach eliminates the need for the laborious, multistep manufacturing finishing processes which are currently practiced in the pigments industry for the manufacture of 2,9-dichloroquinacridone pigments.

DETAILED DESCRIPTION

Pigmentary 2,9-dichloroquinacridone is prepared directly by the oxidation of 2,9-dichloro-6,13-dihydroquinacridone in the presence of sufficient phthalimidomethylquinacridone particle growth inhibitor to directly provide a product with pigmentary properties, without the need for further particle size reducing aftertreatments.

The expressions "direct" or "directly", when used in this application to describe a preparatory process for a pigmentary product, means that the specific surface area of the pigmentary product will be within the range which makes it suitable for use as a pigment, without additional particle size reducing aftertreatments.

The oxidation of 2,9-dichloro-6,13-dihydroquinacridone is generally carried out by heating 2,9-dichloro-6,13-dihydroquinacridone in a reaction mixture additionally comprising an alkali metal hydroxide, an effective mount of an oxidizing agent, a solvent which is generally completely miscible with water and water. In accordance with the inventive process, an effective mount of a phthalimidomethylquinacridone particle growth inhibitor is present in the reaction mixture prior to the addition of the oxidizing agent.

In general, the phthalimidomethylquinacridone particle growth inhibitor is a compound of the formula Formula I

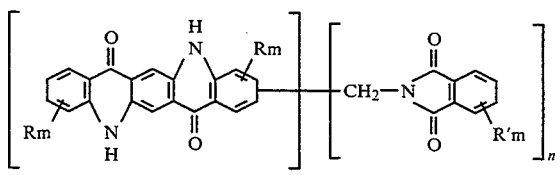

wherein $R_m$ and $R'_m$ are each independently hydrogen, halogen, $C_1$-$C_5$-alkyl and $C_1$-$C_5$-alkoxy, m is zero 1 or 2 and n is 1 or 2. Halogen substituents are, for example, fluorine, chlorine or bromine, in particular chlorine. Alkyl and alkoxy substituents include methyl, ethyl, n-propyl, isopropyl, n-butyl, sec-butyl, tert-butyl, n-pentyl, isopentyl, neopentyl, or tert-pentyl. The compounds of formula I wherein $R_m$ and $R'_m$ are hydrogen and n is 1 are preferred. 2-phthalimidomethylquinacridone is a particularly preferred particle growth inhibitor.

In addition, under the alkaline reaction conditions utilized for the oxidation of 2,9-dichloro-6,13-dihydroquinacridone, any of the phthalimidomethylquinacridone particle growth inhibitors of formula 1 can be at least partially hydrolyzed to the open amide carboxylate anion as shown for the unsubstituted case in the following reaction scheme:

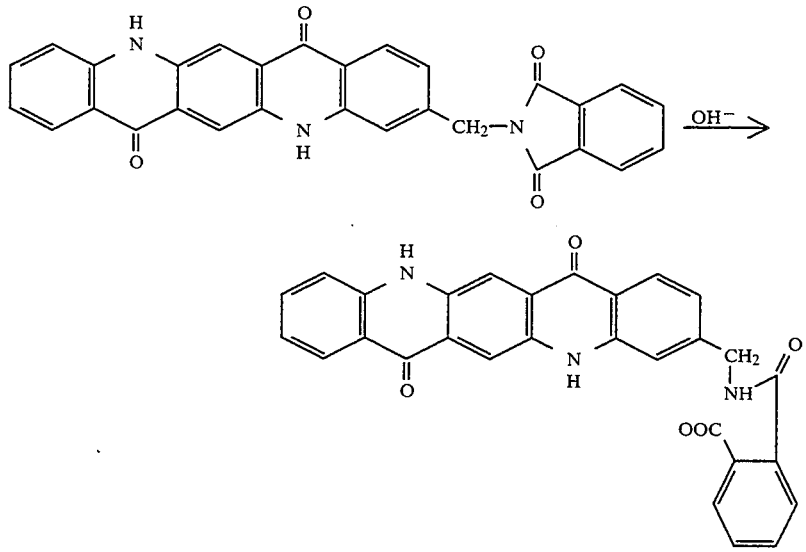

Therefore, the present invention also relates to the oxidation of 2,9-dichloro-6,13-dihydroquinacridone in the presence of a hydrolysis product of a phthalimidomethylquinacridone particle growth inhibitor of formula I. The hydrolysis product is normally in the form of a salt of the o-carboxybenzamidomethylquinacridone which corresponds to a hydrolyzed phthalimidomethylquinacridone particle growth inhibitor of formula I.

The phthalimidomethylquinacridone particle growth inhibitors utilized in the present process can be prepared by known methods, for example, by reaction of a quinacridone with a phthalimide and para-formaldehyde in concentrated sulfuric acid. U.S. Pat. No. 3,275,637, which is here incorporated by reference, discloses the preparation of phthalimidomethylquinacridone particle growth inhibitors.

Reduction in particle size of the 2,9-dichloroquinacridone relative to particle size uninhibited oxidation becomes noticeable with the inclusion of as little as 0.1% of phthalimidomethylquinacridone relative to the weight of 2,9-dichloro-6,13-dihydroquinacridone. The level of additive can be as high as 10% by weight. Although the particle growth inhibitor can be present in amounts greater than 10%, using more than 10% of such the particle growth inhibitor does not serve a useful purpose.

A variety of pigments with varying degrees of particle size and transparency, require a range of from greater than 1%, for example 1.1%, to about 10% of the phthalimidomethylquinacridone. A preferred range of phthalimidomethylquinacridone incorporated during the oxidation of 2,9-dichloro-6,13-dihydroquinacridone to produce pigmentary 2,9-dichloroquinacridone directly is from the minimum amount necessary to directly prepare a pigmentary 2,9-dichloroquinacridone up to about 10 percent by weight of the particle growth inhibitor, for example from 2% up to about 10% by weight. The most useful range of phthalimidomethylquinacridone particle growth inhibitor is up to about 6% by weight, for example from 2% to about 6%, or about 2.5% to about 6%, or about 3% to about 6% by weight of the particle growth inhibitor.

The surface area of the 2,9-dichloroquinacridone product is directly related to the amount of the particle growth inhibitor present during the oxidation and is inversely related to the particle size. Thus, the surface area of the product will increase as the amount of particle growth inhibitor increases. In order for the 2,9-dichloroquinacridone to be suitable for direct use as a pigment, the surface area of the reaction product should be at least 15 meters$^2$/gram, for example in the range of from about 15 to about 90 m$^2$/gram, preferably from about 20 to 90 m$^2$/gram, and most preferably from about 30 to about 70 m$^2$/gram. The surface area can be measured by nitrogen absorption or another suitable method.

The oxidation of 2,9-dichloro-6,13-dihydroquinacridone directly to pigmentary 2,9-dichloroquinacridone is conveniently carded out by heating a reaction mixture comprising 2,9-dichloro-6,13-dihydroquinacridone, a water miscible organic solvent, an alkali metal hydroxide, water and effective mounts of an oxidizing agent and a phthalimidomethylquinacridone particle growth inhibitor. The oxidizing agent is added to the mixture after the alkali metal salt of the dichloro-dihydroquinacridone is formed.

After the oxidizing agent is added, the mixture is heated to a temperature of from about 50° C. to reflux for a specified length of time, generally from about 2 hours to about 8 hours. Preferably, the reaction mixture is heated at reflux for about three hours. The duration of heating is important since excessive heating periods can result in undesirable pigment crystal growth.

According to the inventive process, the reaction mixture will contain a phthalimidomethylquinacridone particle growth inhibitor. The particle growth inhibitor is effective if it is incorporated into the reaction mixture anytime prior to the addition of the oxidizing agent Typically, it is convenient to add the phthalimidomethylquinacridone particle growth inhibitor along with the 2,9-dichloro-6,13-dihydroquinacridone.

The alkali metal hydroxide is, for example, sodium or potassium hydroxide, preferably potassium hydroxide. The alkali metal hydroxide is generally present in at least the amount required to form the di-alkali metal salt of the 2,9-dichloro-6,13-dihydroquinacridone starting material under the reaction conditions. The molar ratio of alkali metal hydroxide to 2,9-dichloro-6,13-dihydroquinacridone is typically at least 7:1, for example from 7:1 to 25:1, preferably from 8:1 to 16:1, most preferably from 9:1 to 14:1.

The organic solvent is any solvent which is miscible in water and is effective in promoting formation and oxidation of the 2,9-dichloro-6,13-dihydroquinacridone salt. The solvent is generally a C1-C3 alcohol, such as methanol, ethanol or any of the propanols, or a dihydroxy solvent, such as the ethylene glycols and their monoethers. In general, there will be sufficient organic solvent to promote formation and solubilization of the 2,9-dichloro-6,13-dihydroquinacridone salt under reaction conditions. The organic solvent is typically present in an amount of about 4 pans by weight per pan of the 2,9-dichloro-6,13-dihydroquinacridone. However, the mount of solvent varies depending on the solubility of 2,9-dichloro-6,13-dihydroquinacridone in the solvent.

Any oxidizing agent capable of oxidizing the 2,9-dichloro-6,13-dihydroquinacridone under the present reaction conditions can be utilized. Preferably, the oxidizing agent is water-soluble. For example, many water-soluble aromatic nitro compounds are suitable oxidizing agents. The oxidizing agent should be present in an amount sufficient to oxidize all of the 2,9-dichloro-6,13-dihydroquinacridone.

The most common and most preferred oxidizing agents are water-soluble salts of m-nitrobenzenesulfonic acid, most preferably the sodium salt. If sodium m-nitrobenzenesulfonate is utilized as the oxidizing agent, it will usually be present in an amount ranging from 0.5 to 1 part per part by weight of the 2,9-dichloro-6,13-dihydroquinacridone present in the reaction mixture. The preferred range is from about 0.5 to about 0.75 parts, most preferably about 0.6 parts, per part by weight of the 2,9-dichloro-6,13-dihydroquinacridone.

The general work-up of the oxidation reaction involves dilution of the reaction mixture with water or methanol and then isolating the pigmentary 2,9-dichloroquinacridone by filtration, followed by washing free of base with water. However, other suitable isolation methods can be used.

The following typical reaction mixture demonstrates the desirable proportions of the components in a reaction mixture:

(a) 40 grams of 2,9-dichloro-6,13-dihydroquinacridone,
(b) 0.04 to 4 grams of the phthalimidomethylquinacridone particle growth inhibitor,
(c) 180-220 ml of methanol,
(d) 130-190 grams of 45% aqueous KOH,
(e) 20-40 grams of sodium m-nitrobenzenesulfonate, and
(f) sufficient water to affect the formation of the potassium salt of 2,9-dichloro-6,13-dihydroquinacridone in the reaction mixture.

The above typical reaction mixture will preferably contain from more than 0.4 to 4.0 grams of the phthalimidomethylquinacridone particle growth inhibitor. The typical reaction mixtures will most preferably contain about 0.44 to 2.4 grams of particle growth inhibitor. The amount of the particle growth inhibitor depends on the particle size of the pigment desired.

The pigments prepared by the present process are suitable for use as pigments for coloring high molecular weight organic materials. High molecular weight organic materials which can be colored or pigmented with the products according to the invention are, for example, cellulose ethers and esters, such as ethylcellulose, nitrocellulose, cellulose acetate or cellulose butyrate, natural and synthetic resins, such as polymerization or condensation resins, such as amino resins, in particular urea- and melamine-formaldehyde resins, alkyd resins, phenolic resins, polycarbonates, polyurethanes, polystyrene, polyvinyl chloride, polyamides, polyolefines, polyesters, ABS, polyphenylene oxide, rubber, caseine, silicone and silicone resins, individually or mixed together with one another.

The high molecular weight organic compounds mentioned can be present individually or in mixtures as plastic materials, melts or in the form of spinning solutions, lacquers, paints or printing inks. Based on the high molecular weight organic material to be pigmented, the pigments according to the invention can be used in an amount of 0.01 to 30% by weight, preferably 0.1 to 10% by weight.

The high molecular weight organic substances are pigmented with the 2,9-dichloroquinacridone, for example, by mixing such a pigment, if desired in the form of a masterbatch, into these substrates using roll mills and mixing or grinding apparatus. The pigmented material is then brought into the desired final form by known methods, such as calendering, pressing, extruding, brushing, casting or injection molding. It may be desirable to incorporate plasticizers into the high molecular weight compounds before the shaping operation in order to produce non-rigid moldings or to reduce their brittleness. Suitable plasticizers are, for example, esters of phosphoric acid, phthalic acid or sebacic acid. Plasticizers can be incorporated before or after the incorporation of the solid solutions according to the invention into the polymers. To obtain different shades, it is further possible to add fillers or other coloring constituents, such as white, colored, or black pigments, in any desired amounts, to the high molecular weight organic substances, in addition to the pigments according to this invention.

The pigments prepared by the present process are particularly suitable for coloring polyvinyl chloride and polyolefins, such as polyethylene and polypropylene, and for pigmenting lacquers and paints, in particular automotive topcoats. When used for this purpose, the pigments prepared by the present process possess good general pigment properties, such as high dispersability, high tinctorial strength and purity and high migration, heat, light and weathering fastness properties.

The following examples are intended to further illustrate, but not to limit, the embodiments of the present invention. All pans are given by weight unless otherwise specified. All percentages of the 2-phthalimidomethylquinacridone particle growth inhibitors are by weight relative to the weight of 2,9-dichloro-6,13-dihydroquinacridone, as are all other percentages given in this application, unless otherwise specified. The width at half height of the x-ray diffraction peaks, $\beta_{\frac{1}{2}}$, is in arbitrary units and is utilized as an indicator of relative particle size, whereby a higher $\beta_{\frac{1}{2}}$ indicates a smaller particle size.

EXAMPLE 1

To a four necked 1 liter round bottom flask equipped with a thermometer, a reflux condenser and a stirrer are added 2,9-dichloro-6,13-dihydroquinacridone (40 g; 0.104 moles) and methanol (202 ml). To this slurry is added, in a thin stream with stirring, an aqueous solution of potassium hydroxide (159.4 g; 45%) maintaining the temperature below 60° C. The above mix is stirred at 50°–60° C. for 15 minutes. Then powdered sodium m-nitrobenzenesulfonate (23 g) is added followed by water (26 ml). The reaction mixture is heated to reflux for 3 hours and then diluted with water to bring the pot temperature to 60°–65° C. The resulting thick slurry is filtered, washed with hot water until the pH of the filtrate is less than 8.5 and the conductivity is less than 110% of the water being used to wash it. The pigment thus obtained is dried at 80° C. and characterized by its x-ray diffraction pattern and full width at half maximum height, $\beta_{\frac{1}{2}}$, of the peak at 27.8 2⊖. The surface area and a rubout are also evaluated.

The pigment according to this example showed an X-ray diffraction pattern that is of a $\gamma$-phase 2,9-dichloroquinacridone. The $\beta_{\frac{1}{2}}$ of the peak at 27.8 2⊖ is 0.291. The surface area is 19.8 m²/g. The rubout evaluation reveals a light masstone and a very weak tint. The product analysis shows 94.7% of 2,9-dichloroquinacridone.

EXAMPLE 2

To a four necked 1 liter round bottom flask equipped with a thermometer, a reflux condenser and a stirrer are added 2,9-dichloro-6,13-dihydroquinacridone (40 g; 0.104 moles), 2-phthalimidomethylquinacridone (0.2 g; 0.5% based on weight) and methanol (202 ml). To this slurry is added, in a thin stream, with stirring an aqueous solution of potassium hydroxide (159.4 g; 45%) maintaining the temperature below 60° C. The above mixture is stirred at 50°–60° C. for 15 minutes. Then powdered sodium m-nitrobenzenesulfonate (23 g) is added, followed by water (26 ml). The reaction mixture is heated to reflux for 3 hours and then diluted with water to bring the pot temperature to 60°–65° C. The resulting thick slurry is filtered, washed with hot water until the pH of the filtrate is less than 8.5 and the conductivity is less than 110% of the water being used to wash it. The pigment thus obtained is characterized as described in example 1.

The X-ray diffraction pattern is that of $\gamma$-phase 2,9-dichlorquinacridone with a $\beta_{\frac{1}{2}}$ of the peak at 27.8 2⊖ of 0.374. The surface area is 33.1 m²/g. The rubout evaluation revealed a masstone somewhat darker and considerably stronger in tint compared to the product of example 1. The product analysis showed 94.2% of 2,9-dichloroquinacridone.

EXAMPLE 3

The oxidation of 2,9-dichloro-6,13-dihydroquinacridone is performed following the procedure used in example 2 with the exception that 0.4 g (1.0% based on the weight of the dichloro-dihydroquinacridone), instead of 0.2 g, of 2-phthalimidomethylquinacridone is used.

The resulting pigment has the x-ray diffraction pattern of $\gamma$-phase 2,9-dichloroquinacridone. The $\beta_{\frac{1}{2}}$ of the peak at 27.8 2⊖ is 0.421. The surface area is 45.6 m²/g. The rubout evaluation indicated that the pigment is noticeably bluer and darker than example 2 and the tint is essentially equal in strength but yellower and more intense. The analysis showed 93.6% of 2,9-dichloroquinacridone.

EXAMPLE 4

The oxidation of 2,9-dichloro-6,13-dihydroquinacridone is performed following the procedure used in example 2 with the exception that 0.8 g (2% weight basis) instead of 0.2 g of 2-phthalimidomethylquinacridone is used.

The resulting pigment exhibits the X-ray diffraction pattern of $\gamma$-phase 2,9-dichloroquinacridone. The $\beta_{\frac{1}{2}}$ of the peak at 27.8 2⊖ is 0.507. The surface area is 61.7 m²/g. The rubout indicated a bluer, darker and more intense and transparent masstone color and an identical tint compared to the pigment described in example 3. The analysis showed 92.9% of 2,9-dichloro quinacridone.

EXAMPLE 5

A procedure similar to example 2 is used with the exception that 1.2 g (3% weight-basis), instead of 0.2 g, of 2-phthalimidomethylquinacridone, is used.

The resulting pigment has the X-ray diffraction pattern of $\gamma$-phase 2,9-dichloroquinacridone. The $\beta_{\frac{1}{2}}$ of the peak at 27.8 2⊖ is 0.588. The surface area is 68.5 m²/g. The rubout evaluation revealed a considerably darker, more transparent and more intense masstone color compared to the pigment described in example 4.

EXAMPLE 6

To a five liter four necked round bottom flask equipped with a thermometer, a reflux condenser and a stirrer are added 2,9-dichloro-6,13-dihydroquinacridone (200 g; 0.522 mole), 2-phthalimidomethylquinacridone (6.0 g; 3% based on dichloro-dihydroquinacridone) and methanol (1010 ml). To this slurry is added in a thin stream with stirring a 45% aqueous solution of potassium hydroxide (797 g) maintaining the temperature below 60° C. The above mixture is stirred at 50°-60° C. for 15 minutes and to this is added powdered sodium m-nitrobenzenesulfonate (115 g) followed by water (130 ml). The reaction mixture is heated to reflux for 3 hours and diluted with enough methanol to bring the pot temperature to 60°-65° C. The resulting slurry is filtered and washed with methanol until all the colored bleed disappears. The resulting filtrate is then washed with hot water to a pH less than 8.5 and conductivity of less than 110% of the wash water. The pigment thus obtained after drying at 80° C. is compared to the pigment obtained according to example 5. The pigment showed better tinting strength than the one according to example 5 but is identical in all the other respects.

EXAMPLE 7

A procedure similar to example 2 is used with the exception that 1.67 g (4.2% weight basis), instead of 0.2 g, of 2-phthalimidomethylquinacridone is used.

The resulting pigment has the X-ray diffraction pattern of γ-phase 2,9-dichloroquinacridone. The $\beta_{\frac{1}{2}}$ of the peak at 27.8 2⊖ is 0.687. The surface area of 75.1 m²/g. The rubout evaluation revealed an even darker and more transparent masstone color in comparison to the pigment described in example 5.

The pigment analyzes 89.6% 2,9-dichloroquinacridone, less than 0.1% 2,9-dichloroquinacridonequinone and 0.2% 2,9-dichloro 6,13-dihydroquinacridone.

EXAMPLE 8

A procedure described for example 2 is used except that, 2.11 g (5.3% weight-basis), instead of 0.2 g, of 2-phthalimidomethylquinacridone is used.

The resulting pigment has the X-ray pattern of γ-phase 2,9-dichloroquinacridone. The $\beta_{\frac{1}{2}}$ of the peak at 27.8 2⊖ is 0.702. The surface area is 75.4 m²/g. By rubout, the pigment displayed an equally attractive deep and transparent masstone but is much darker compared to the pigment of example 7.

The pigment analyzes for the presence of 0.3% of 2,9-dichloro-6,13-dihydroquinacridone and less than 0.1% 2,9-dichloroquinacridonequinone in addition to 2,9-dichloroquinacridone.

EXAMPLE 9

A procedure used in example 2 is followed except 2.55 g (6.4% weight-basis) instead of 0.2 g of 2-phthalimidomethylquinacridone is used.

The resulting pigment has an X-ray pattern of γ-phase 2,9-dichloroquinacridone with a $\beta_{\frac{1}{2}}$ of 27.8 2⊖ peak of 0.746 and a surface area of 74.0 m²/g. The rubout evaluation revealed that the pigment, although a trace darker, is almost identical to the pigment described in example 8.

The analysis corresponds to the presence of 0.3% 2,9-dichloroquinacridonequinone and 0.5% 2,9-dichloro-6,13-dihydroquinacridone.

EXAMPLE 10

The procedure described in example 6 is used except that 8.0 g (4% weight-basis), instead of 6.0 g, of 2-phthalimidomethylquinacridone is used.

The resulting pigment shows an X-ray pattern of γ-phase 2,9-dichloroquinacridone with a $\beta_{\frac{1}{2}}$ of the peak at 27.8 2⊖ of 0.707 and a surface area of 73.6 m²/g. The rubout evaluation exhibited an attractive looking deep and transparent masstone and a strong tint when compared to the pigment of example 7.

EXAMPLE 11

A procedure similar to example 6 is followed wherein 12.0 g, (6% weight-basis), instead of 6.0 g, of 2-phthalimidomethylquinacridone is used. The resulting pigment is, by rubout, identical in tint, strength and intensity but is darker in masstone when compared to the product of example 10. The pigment showed an γ-phase X-ray diffraction pattern of γ-phase 2,9-dichloroquinacridone with a $\beta_{\frac{1}{2}}$ of 0.750 for the 27.8 2⊖ peak and a surface area of 73.9 m²/g.

EXAMPLE 12

A procedure similar to example 2 is followed with the following exceptions:
(a) the mount of 2-phthalimidomethylquinacridone is 1.6 g (4% weight basis) instead of 0.2 g during oxidation.
(b) The sequence of addition is altered in that 2-phthalimidomethylquinacridone is added after the addition of methanol and aqueous potassium hydroxide and just prior to the addition of sodium m-nitrobenzenesulfonate.

The pigment thus obtained is a γ-phase 2,9-dichloroquinacridone with a $\beta_{\frac{1}{2}}$ of the peak at 27.8 2⊖ of 0.675, which, by rubout, shows a masstone similar m that of example 7.

EXAMPLE 13

1.6 g of the pigment according to example 5 is homogenized with 2.4% of epoxidized soybean oil to get a uniform paste. 2.5 g of this paste is thoroughly mixed with 100 g of polyvinyl chloride, 45.0 g of dioctyl phthalate, 5.0 g of epoxidized soybean oil and 3.0 g of IRGASTOB 634 (a CIBA-GEIGY additive) by adding to a rotating laboratory two roll mill at 145° C. The above mixture is constantly folded, removed and re-fed to the two roll mill with 1:1.2 friction.

The resulting polyvinylchloride sheet shows a strong blue shade red coloration with excellent fastness to heat, light and migration.

A similar procedure using 0.25 g of the paste instead of 2.5 g as mentioned above in combination with 1.0 g of TiO₂ shows excellent TiO₂ extended colors (tints).

EXAMPLE 14

12 g of the pigment from example 5,3 g of IRGANOX 245, 3 g TINUVIN 328 and 9 g of TINUVIN 770 (all additives from CIBA-GEIGY Corporation) and 1173 g of ABS resin are mixed together and added to a Banbury mixer and mixed for approximately 2 minutes at 125°-135° C. The pigmented resin is then discharged from the Banbury mixer and chopped into small pieces and then granulated. The granulated material is then dried at 90° C. for 2 hours in an oven and is injection molded at 205°, 260° C. and 315° C. on a Battenfeld 170/460 molder with 5 minute dwell time and 30 second cycle time.

The pigment shows excellent heat stability when compared to a commercial, small particle size 2,9-dichloroquinacridone pigment.

EXAMPLE 15

(A) Pigment Preparation for Paints:

The presscake pigment prepared according to example 10 (50 g dry basis) is blended with a presscake of the aluminum salt of quinacridone monosulfonic and (4% based on the pigment) and the resulting pigment isolated, dried and pulverized and used in a paint formulation.

(B) Pigment Dispersion:

A pint jar is charged with 26.4 g of the above mentioned pigment, 66.0 g of an acrylourethane resin, 14.4 g of a dispersant resin and 58.2 g of a solvent (thinner). The mixture is milled using 980 g of grinding media for 64 hrs. to prepare the pigment base containing 16% pigment and 48% solids at a pigment to binder ratio of 0.5.

(C) Aluminum Base:

The aluminum base is obtained by mixing 405 g of aluminum paste (SPARKLE SILVER 5242-AR from SILBERLINE) with 315 g of acrylic dispersion resin and 180 g of acrylic resin in a quart can with an air mixer at slow to medium speed until lump-free (1-2 hrs.).

(D) Metallic Clearcoat Solution:

Add 1353 g. of a non-aqueous dispersion resin, 786.2 g of melamine resin, 144.6 g xylene, 65.6 g of a UV screener solution and 47 1.6 g acrylourethane resin, in the order mentioned and mix thoroughly with an air mixer for 15 minutes. Continue mixing and add slowly 89.0 g of a premixed solution of an acid catalyst and 90.0 g methanol to insure the solution is thoroughly incorporated.

(E) Metallic Paint Formulation:

The basecoat paint is prepared by mixing 35.5 g of the pigment base described above, 5.1 g aluminum base, 5.3 g non-aqueous dispersion resin and 54.1 g metallic clear consisting of 7.1% pigment and 54.4% solids with a pigment to binder ratio of 0.15.

(F) Aluminum panels treated with grey acrylic primer are sprayed with two coats of the basecoat paint to a film thickness of 15-20 microns on a dry film basis. The two sprayings are spaced by a 90-second flash at room temperature. After a flash of 3 minutes, the acrylic clear topcoat is applied by spraying two coats (90 seconds flash between coats) to a film thickness of 37-50 microns on a dry film basis. The panels are dried for 10 minutes at room temperature and baked at 120° C. for 30 minutes.

The resulting coating exhibits an attractive, intense color with excellent two-tone and high gloss and distinctness of image.

In addition to the embodiments described above, numerous variations of these embodiments can be made in accordance with this invention.

We claim:

1. A process for the direct preparation of pigmentary 2,9-dichloroquinacridone, which comprises oxidizing 2,9-dichloro-6,13-dihydroquinacridone directly to pigmentary 2,9-dichloroquinacridone by heating a reaction mixture consisting essentially of 2,9-dichloro-6,13-dihydroquinacridone, an alkali metal hydroxide, a water-soluble organic solvent, water and effective amounts of an oxidizing agent and a particle growth inhibitor, wherein the molar ratio of the alkali metal hydroxide to the 2,9-dichloro-6,13-dihydroquinacridone is at least 7:1 and wherein said particle growth inhibitor is a compound of the formula

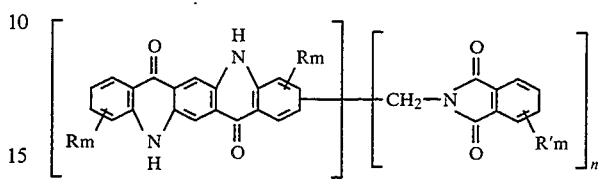

wherein R and R' are each independently hydrogen, halogen, $C_1$-$C_5$-alkyl and $C_1$-$C_5$-alkoxy, m is zero, 1 or 2 and n is 1 or 2, or a o-carboxybenzamidomethylquinacridone hydrolysis product thereof.

2. A process of claim 1 wherein R and R' are hydrogen and n is 1.

3. A process of claim 1 wherein the particle growth inhibitor is 2-phthalimidomethylquinacridone or a hydrolysis product thereof.

4. A process of claim 1 wherein the particle growth inhibitor is present in an amount ranging from greater than 1 to about 10 percent by weight, based on the weight of the 2,9-dichloro-6,13-dihydroquinacridone.

5. A process of claim 1 wherein the particle growth inhibitor is present in an amount ranging from about 2 to about 6 percent by weight, based on the weight of the 2,9-dichloro-6,13-dihydroquinacridone.

6. A process of claim 1 wherein the alkali metal hydroxide is sodium hydroxide or potassium hydroxide.

7. A process of claim 6 wherein the alkali metal hydroxide is potassium hydroxide.

8. A process of claim 1 wherein the molar ratio of alkali metal hydroxide to 2,9-dichloro-6,13-dihydroquinacridone is from 8:1 to 16:1.

9. A process of claim 1 wherein the organic solvent is a $C_1$-$C_3$ alcohol or an ethylene glycol or a monoether thereof.

10. A process of claim 9 wherein the organic solvent is methanol.

11. A process of claim 7 wherein the particle growth inhibitor is present in an amount ranging from about 2 to about 6 percent by weight, based on the weight of the 2,9-dichloro-6,13-dihydroquinacridone.

12. A process of claim 7 wherein the particle growth inhibitor is present in an amount ranging from about 2 to about 6 percent by weight, based on the weight of the 2,9-dichloro-6,13-dihydroquinacridone, the particle growth inhibitor is 2-phthalimidomethylquinacridone or a hydrolysis product thereof and the oxidizing agent is a water-soluble m-nitrobenzenesulfonate salt.

13. A process of claim 12 wherein the molar ratio of alkali metal hydroxide to 2,9-dichloro-6,13-dihydroquinacridone is from 8:1 to 16:1.

14. A process of claim 13 wherein the molar ratio of alkali metal hydroxide to 2,9-dichloro-6,13-dihydroquinacridone is from 9:1 to 14:1.

15. A process of claim 1 wherein the 2,9-dichloroquinacridone has a surface area greater than 15 $m^2$/gram.

16. A process of claim 15 wherein the 2,9-dichloroquinacridone has a surface area from about 20 to about 90 $m^2$/gram.

17. A process of claim 1 wherein the reaction mixture is heated to reflux for about three hours.

18. A process of claim 1 which further comprises isolating the 2,9-dichloroquinacridone by diluting the reaction mixture with water or a $C_1$–$C_3$-alcohol and subsequently filtering the diluted reaction mixture.

19. A process of claim 12 wherein the 2,9-dichloroquinacridone has a surface area from about 20 to about 90 $m^2$/gram.

20. A process of claim 12 wherein the reaction mixture is heated to reflux for about three hours.

* * * * *